United States Patent
Srivastava et al.

[11] Patent Number: 5,900,969
[45] Date of Patent: May 4, 1999

[54] BROADBAND FLAT GAIN OPTICAL AMPLIFIER

[75] Inventors: Atul Kumar Srivastava, Eatontown; James W. Sulhoff, Ocean; Yan Sun, Middletown; Jianhui Zhou, Freehold; John Lehrer Zyskind, Shrewsbury, all of N.J.

[73] Assignee: Lucent Technologies Inc., Murray Hill, N.J.

[21] Appl. No.: 08/800,870

[22] Filed: Feb. 14, 1997

[51] Int. Cl.[6] .............................. H04B 10/16; H01S 3/00
[52] U.S. Cl. .................... 359/341; 359/161; 359/177; 359/337
[58] Field of Search ..................... 359/124, 134, 359/160, 161, 177, 337, 341

[56] References Cited

U.S. PATENT DOCUMENTS

| | | | |
|---|---|---|---|
| 5,225,922 | 7/1993 | Chraplyvy et al. | 359/124 |
| 5,463,487 | 10/1995 | Epworth | 359/124 |
| 5,557,442 | 9/1996 | Huber | 359/179 |
| 5,572,443 | 11/1996 | Emoto et al. | 359/173 |
| 5,583,689 | 12/1996 | Cassidy et al. | 359/341 |

FOREIGN PATENT DOCUMENTS

| | | |
|---|---|---|
| 8046297 | 2/1996 | Japan . |
| 2280561 | 1/1995 | United Kingdom . |

OTHER PUBLICATIONS

Elrefaie et al, IEEE Photonics Techn. Lett., vol. 5, #9, pp. 1026–1028, Sep. 1993, about only herewith.
Sun et al, LEO's '96 Ann. Mtg. , Nov. 19, 1996, vol. 2, pp. 365–366; about only herewith.
Park et al, Proc. 97 Conf. on Lasers & Electro–Optics, CLEO, May 23, 1997; about only herewith.
Oda et al, OFC '95 tech. Digest, Aug. 8, 1995, pp. 27–28.

*Primary Examiner*—Nelson Moskowitz

[57] ABSTRACT

An optical amplifier that receives an optical signal at an input of the optical amplifier is arranged so that it amplifies the signal and then adjusts the level of the amplified input signal to a predetermined level. The optical amplifier, which includes a filter to substantially decrease the wavelength dependence of the optical amplifier, then amplifies the adjusted signal and supplies the resulting signal to an output.

9 Claims, 4 Drawing Sheets

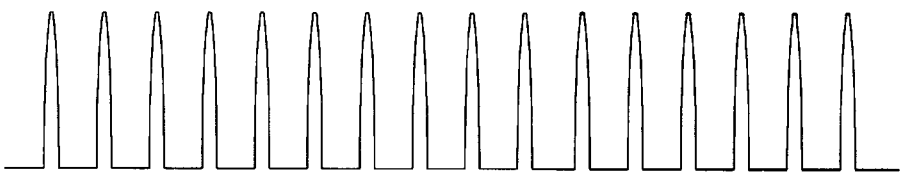
FIG.4A
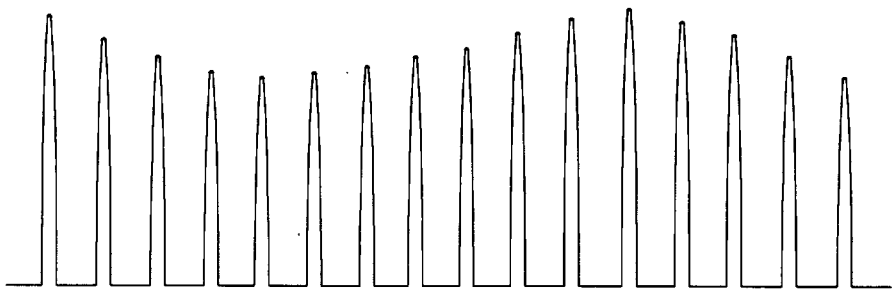
FIG.4B
FIG.4C
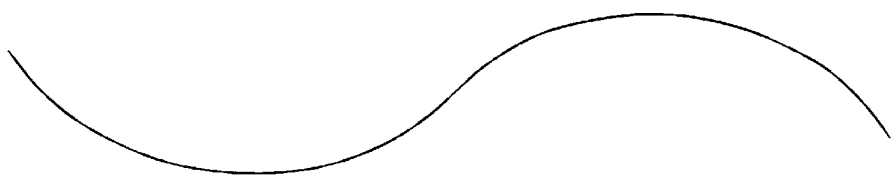
FIG.4D
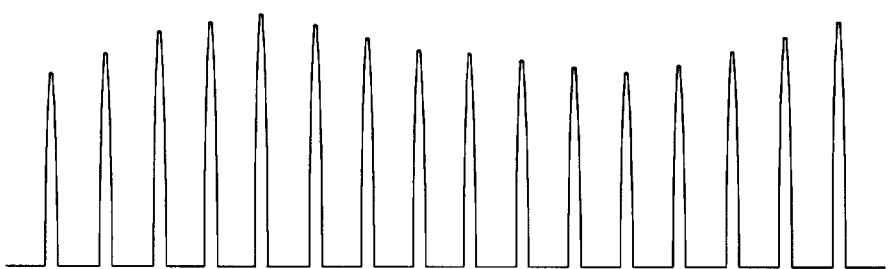
FIG.4E
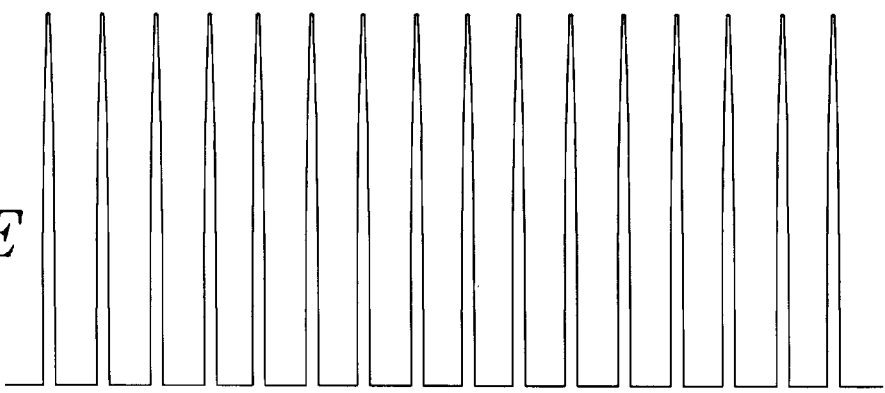

BROADBAND FLAT GAIN OPTICAL AMPLIFIER

TECHNICAL FIELD

The present invention relates to optical communications systems and more particularly to optical systems employing optical amplifiers.

BACKGROUND OF INVENTION

A series of spaced-apart optical amplifiers are typically in the transmission path of optical communications system to amplify optical signals that are being transported over the path. In such systems, a plurality of information bearing optical signals are typically transported over the optical path as multiplexed channels of different wavelengths. It has been noted that if the gain of an optical amplifier is different for the different channels being amplified, then the difference in gain accumulates as the signal channels pass through each of the series of amplifiers. Consequently, this results in the channels having different signal power levels and different signal to noise ratios, which undoubtedly impairs the performance of the optical communications system.

Disadvantageously, in a so-called point-to-point optical transmission system, such differences impose a severe limitation on the number of amplifiers that may be disposed in the transmission path before transmission quality of the weak channels becomes unacceptable. Consequently, this limits the transmission distance in a point-to-point transmission system. Further, in optical networks where signal channels from different transmission routes are branched or cross-connected, such differences limits the size and scale of the network.

SUMMARY OF THE INVENTION

In a lightwave communication system, the level of input power into an optical amplifier is affected by many factors, for example, the loss between the signal sources and the amplifier and/or the loss between amplifiers. As such, the level of input power to a series of optical amplifiers in a lightwave communication system may be substantially different. The input power may also vary over time as a result of changes in cable loss and aging of various devices in the optical system. It would be advantageous that the amplifiers maintain a flat gain spectrum for a large input dynamic range.

We achieve a flat gain spectra in an optical amplifier by first amplifying a received optical signal and then adjusting the level of the amplified input signal to a predetermined level and then amplifying the adjusted signal, in which the wavelength dependence of the optical amplifier is substantially reduced to achieve the desired gain spectra.

DETAILED DESCRIPTION OF THE DRAWING

Figure 2:
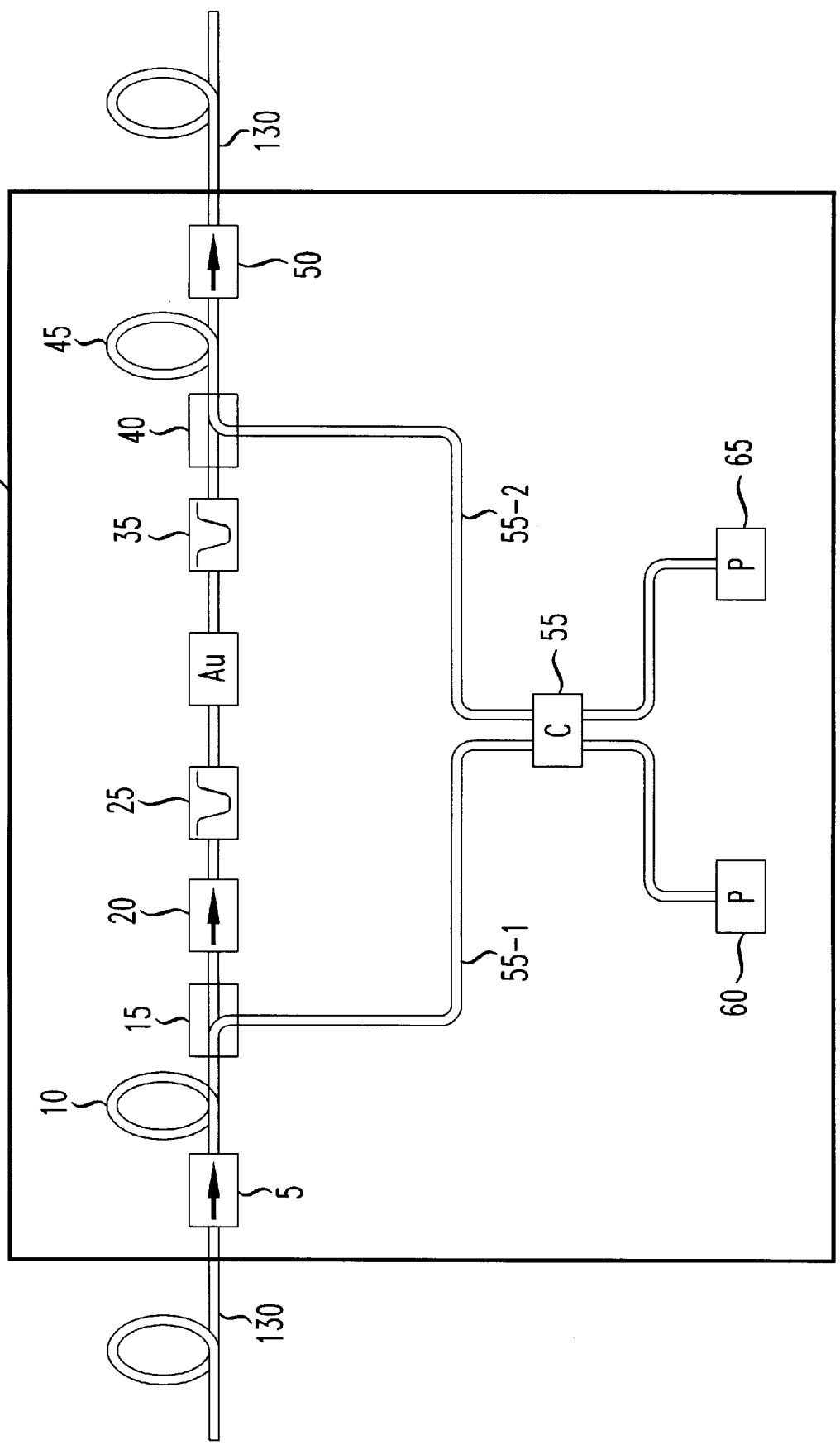
FIG. 2 is a broad block diagram of the amplifier shown in FIG. 1.

FIGS. 4A through 4E respectively illustrate various spectra within an amplifier 100 of FIG. 2.

DETAILED DESCRIPTION

In an illustrative example of the invention, a wavelength multiplexed optical signal composed of a number of individual optical component signals, e.g., N signals, having respective wavelengths of $\lambda_1, \lambda_2, \lambda_3 \ldots \lambda_N$, is transmitted from a source to a receiver via an optical transmission line, where N>1 and may be, e.g., eight.

Figure 1:
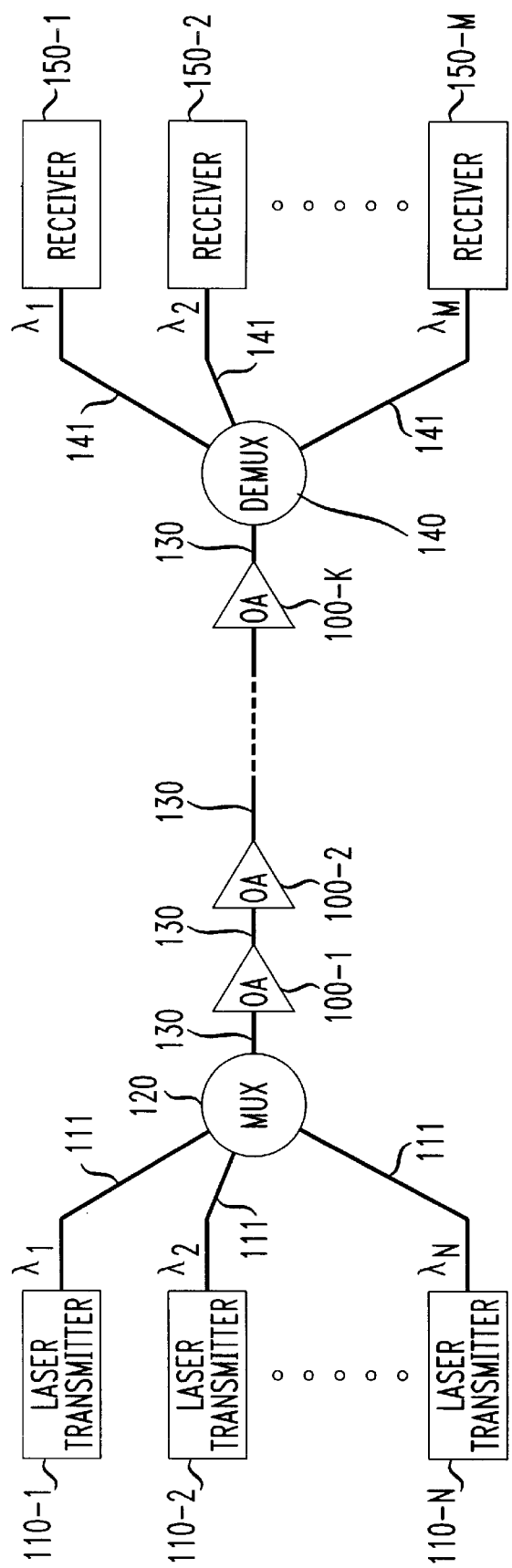
FIG. 1 illustrates an optical system in which the principles of the invention may be practiced.

An illustrative optical system embodying the principles of the invention is shown in simplified form in FIG. 1. The optical system, more particularly, includes a plurality of laser transmitters 110-1 through 110-N, multiplexer 120, a plurality of optical amplifiers disposed along optical transmission path 130, demultiplexer 140 and optical receivers 150-1 through 150-M. Each such transmitter outputs a respective information bearing optical signal having a unique wavelength, $\lambda_i$. it is assumed herein that such a signal is destined for one of the receivers 150-1 through 150-M. For the present discussion, it is assumed that the transmission system has N optical channels respectively associated with transmitters 110-1 through 110-N. The N channels are identified by their respective wavelengths, $\lambda_1, \lambda_2, \lambda_3$ and $\lambda_N$, which are sufficiently separated from one another to prevent signals in adjacent channels from interfering with one another. Such separation may be, for example, 200 GHz. The signals that are outputted by transmitters 110-1 through 110-N are combined (multiplexed) at MUX 120 and then outputted to optical transmission line 130. The outputted signal is then transported trough optical transmission system via amplifiers 100-1 through 100-K and optical cables 130 to DEMUX 140. DEMUX 140 separates the combined signals from one another and supplies the separated signals to respective ones of the receivers 150-1 through 150-M, where M may be, for example, equal to N.

In a lightwave communication system, the input power into an optical amplifier depends either on the loss between the signal sources and the amplifier or on the loss between two amplifiers. As such, the input power to each of the optical amplifiers disposed in a lightwave communication system may be different. The input power may also vary over time as a result of changes in cable loss and the aging of various devices used in the system. For these reasons an amplifier has to maintain a flat gain spectra for a large dynamic range of input signals.

However, the gain spectrum of an optical amplifier, which, for Wavelength Division Multiplexed (WDM) systems and networks, typically operates in deep saturation, depends strongly on the input power to an optical amplifier. What this means is that the gain spectrum of the optical amplifier will vary as a function of the level of the input power. The gain spectrum of an optical amplifier may be optimized (e.g., to decrease the dependence on the wavelength) for one level of input signal. However, such optimization would not hold for differential levels of input signal, but will change accordingly.

In practical light wave communication systems, the span losses may vary over time and from span to span, which causes optical amplifiers on different spans to experience large differences in "input powers". We have recognized that it is very difficult to adjust precisely in practical systems such input power levels. If this is not dealt with, then the aforementioned problems will affect the performance, e.g.., bit error rate, of the optical system.

We have also recognized that the gain spectrum of an optical amplifier may be adjusted for different levels of input signal power, and thus for different span losses. We do this, in accordance with the invention, by adjusting the level of the input signal to a known level before the signal is amplified at a stage of amplification other than the first/input stage. In accordance with an aspect of the invention, such adjustment is done prior to the last stage of amplification. Moreover, such adjusting is also a function of the number of channels forming the signal to be amplified, in accordance with an aspect of the invention.

A detailed block diagram of an optical amplifier 100-i is shown in FIG. 2. Amplifier 100-i, more particularly, receives a signal via optical input path 130 and conventional optical isolator device 5. Isolator device 5 forces the received optical signal to propagate toward rare-earth doped fiber 10 and rejects any spontaneous noise that is generated along input fiber 130. Doped fiber 10, which may be, for example, an erbium doped fiber, provides optical gain when "pumped" by optical power supplied by pump lasers 60 or 65 via Wavelength Division Multiplexer (WDM) 15. Pump lasers 50 and 65 each excite the ions in doped fiber 10. The incoming signal photons collide with the excited ions, thereby causing the ions to release photons identical to the incoming photon. The released photons then join the incoming photons and propagate toward isolator 20 as an amplified signal. Isolator 20 prevents noise and/or reflected signals traveling toward WDM 15 from interfering with the amplifier function occurring at the input stage comprising isolator 5, doped fiber 10 and WDM 15.

It is seen from the FIG. that coupler 55 combines the output from laser pumps 60 and 65 and then supplies a first portion of the combined output, i.e., pump power, to WDM 15 and supplies the remaining portion to WDM 40, in which such portions may or may not be equal. It is noted that two laser pumps are used in an illustrative embodiment of the invention to provide redundancy so that amplifier 100-i may continue to function properly even though one of the laser pumps stops operating (i.e., fails).

The signal amplified by the first stage of amplifier 100-1 is then supplied via conventional isolator 20 to optical filter 25 which may be designed in a conventional way to filter out so-called Amplified Spontaneous Emission (ASE) noise outside of the signal band of the amplified signal, and thus prevent such noise from competing with the amplified signal for the available power (gain) provided at the second stage of amplifier 100. In an illustrative embodiment of the invention, optical filter 25 may be further designed in a conventional way to operate at a wavelength band lower than the lower cutoff wavelength for the signal band, in which the latter wavelength may be, e.g., 1530 nanometers.

Figure 3:
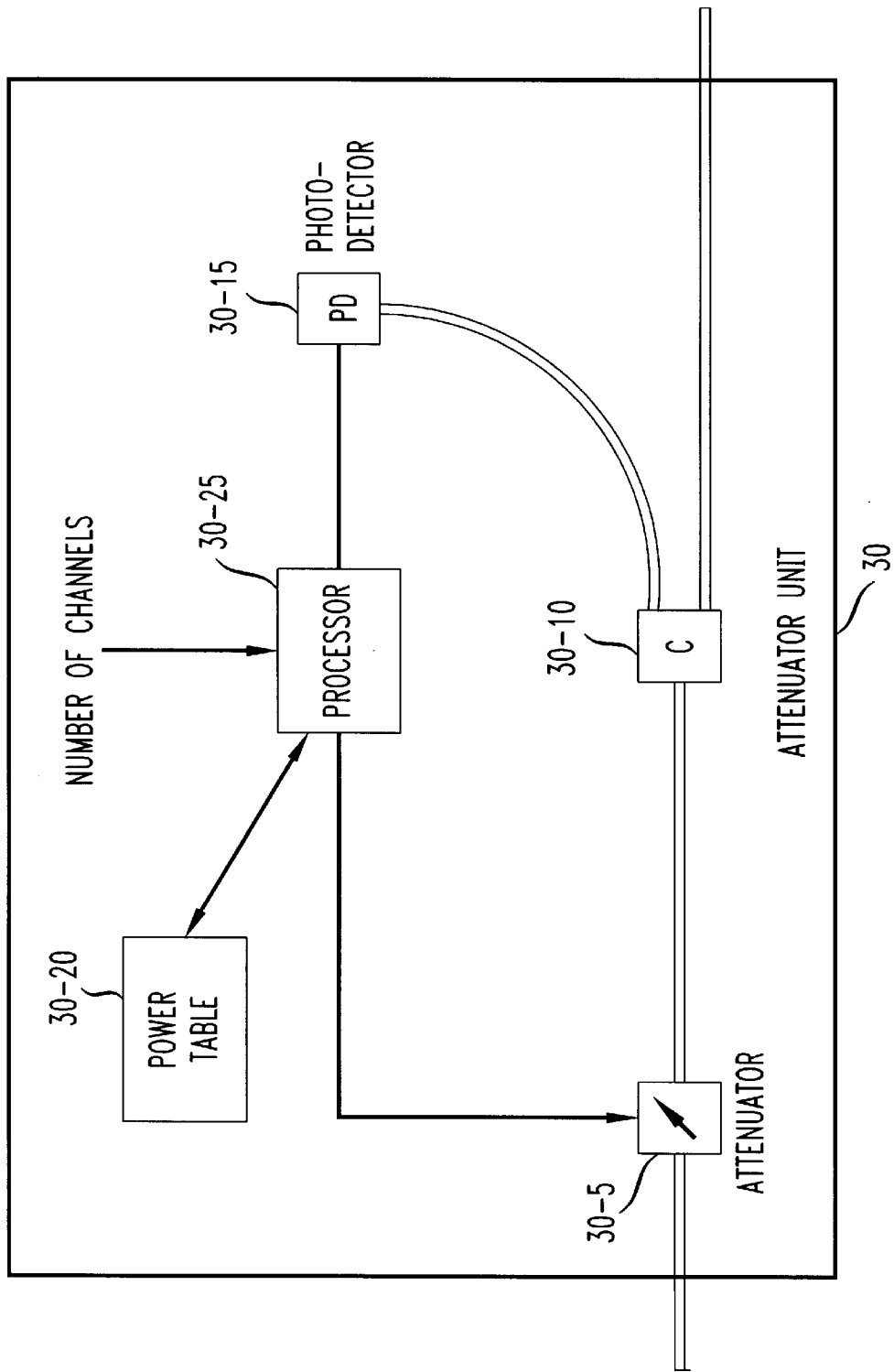
FIG. 3 is a broad block diagram of the attenuator unit of FIG. 2.

The filtered signal is then supplied to variable attenuator unit (AU) 30. A broad block diagram of an illustrative embodiment of attenuator unit 30 is shown in FIG. 3 and includes a conventional electrically controlled variable signal attenuator (hereinafter "variable attenuator") 30-5, conventional fiber coupler (splitter) 30-10, photo detector 30-15 optical fiber 1300-15 and processor 30-25. Specifically, coupler 30-10 supplies a predetermined portion of the amplified signal supplied by filter 25 via variable attenuator 30-5 to photo detector 30-15 which outputs to processor 30-25 an electrical signal having a level proportional to the level of the optical signal supplied to detector 30-15. Processor 30-25, using the number of active channels contained in the signal received at the input of amplifier 100 as an index, accesses a power table 30-20 location containing a value representing the power level for the number of detected channels. Processor 30-25 then converts the level of the signal that it receives from photo diode 30-15 and compares that value with the value unloaded from the accessed power table 30-20 location. If the values compare with one another, then processor 30-25 does nothing. Otherwise, processor 30-25 sends signals to attenuator 30-25 to adjust (increase or decrease) the level of attenuation thereat until the aforementioned values compare with one another.

The values stored in power table 30-20 may be determined using the following expression:

$$I_{PD} = P\, N_{ch}\, R\, \eta(e/hv_s) \qquad (1)$$

where $I_{PD}$ is the target current level; P is the target per channel power level at the input to fiber coupler 30-10; R is the splitting ratio of fiber coupler 30-10; $\eta$ is the quantum efficiency of photo detector 30-15, e is the electron charge constant and $hv_s$ is the energy of a signal photon. (It is noted that the photon energy is slightly different for different channels. For the sake of simplicity, we consider that the level of such energy is the same for all channels.)

(It is also noted that the number of active channels may be detected by, for example, detecting and counting so-called pilot tones respectively identifying the active channels in the signal received via input fiber 130. (One exemplary way of detecting such pilot tones is disclosed in U.S. Pat. No. 5,463,487 issued on Oct. 31, 1995 to R. E. Epworth, which is hereby incorporated by reference.)

Returning to FIG. 2, the adjusted signal outputted by AU 30 is then supplied to "gain flattening" filter 35. Filter 35, more particularly, has a response that is the inverse of the gain spectrum of the input and output stages of amplifier 100 to a signal level corresponding to the level of the aforementioned adjusted signal, in which the output stage comprises WDM 40, doped fiber 45 and isolator 50. The filtered signal is then supplied to WDM 40 which combines the filtered signal and the pump power received via doped fiber 55-2 and the combined signal to doped fiber 45, whereat optical amplification of the signal occurs in the manner discussed above. The amplified signal is then supplied to output optical fiber 130 via isolator 50.

FIGS. 4A, 4B, 4D and 4E illustrate exemplary spectra of the signals that respectively appear at the input of isolator 5, input of filter 35, output of filter 35 and output of isolator 35 of amplifier 100i. (Note that the spectra do not include ASE noise and are not to scale.) It is seen from those FIGs. that the spectra is initially flat (FIG. 4A), then shaped by the first stage of amplifier 100 (FIG. 4B), then filtered in accordance with the loss spectrum illustrated in FIG. 4C, filtered (4D) and then amplified (4E).

The foregoing is merely illustrative of the principles of the invention. Those skilled in the art will be able to devise numerous arrangements, which, although not explicitly shown or described herein, nevertheless embody those principles that are within the spirit and scope of the invention. For example, the function performed by filters 25 and 35 could be implemented by a single filter. Also, the amplifier could include more or less than two laser pumps. In fact, a single laser pump could replace the two laser pumps shown in FIG. 2. Moreover, although the foregoing description assumed that laser pumps 60 and 65 had the same wavelengths, in alternative arrangements such wavelengths may be different and the coupled arrangement may be different. For example, one laser pump could be associated solely with the first amplifier stage and another laser pump could be associated solely with the second amplifier stage. Although, the foregoing description was directed to an amplifier having two stages, it is clear that the amplifier may include additional stages. As a further example, attenuator unit 30 may be implemented in a number of different ways. For example, coupler 30-10 could be placed at the input to unit 30. However, in that instance, the overall operation of attenuator unit 30 would change to accommodate that placement.

We claim:

1. An optical signal amplifier comprising an input amplification stage for amplifying an optical signal received at an input, in which the received optical signal is composed of a plurality of optical signals of respective wavelengths, an attenuator circuit, responsive to the optical signal amplified by the input amplification stage, for attenuating the amplified optical signal as a function of the number of said respective wavelengths, and supplying the resulting optical signal to an output of the attenuator circuit, and a gain flattening filter for processing the optical signal outputted by the attenuator circuit, said gain flattening filter having a response that is an inverse of a gain spectrum of the input amplification stage and an output amplification stage, in which the output stage combines the signal processed by the gain flattening filter and a signal provided by a laser pump and amplifies the combined signal and supplies the amplified combined signal to an output terminal.

2. The optical amplifier of claim 1 wherein the input amplification stage includes at least a wavelength division multiplexer (WDM) and an erbium doped fiber, in which the erbium doped fiber amplifies the signal deceived at the input in accordance with an optical power signal supplied via the WDM, and in which the WDM then supplies the latter amplified signal to an output for delivery to the attenuator circuit.

3. The optical amplifier of claim 2 wherein the optical power signal is supplied by the laser pump.

4. The optical amplifier of claim 1 further comprising an optical filter disposed between the input amplification stage and attenuator unit for removing noise from the signal outputted by the input amplification stage and then supplying the filtered signal to the attenuator circuit.

5. The optical amplifier of claim 1 wherein the attenuator circuit comprises an electrically controlled variable attenuator for attenuating the optical signal amplified by the input amplification stage, in accordance with a control signal, an optical coupler that, responsive to the attenuated signal, supplies a portion of that signal to a converter circuit and supplies the remainder of that signal to an output, in which the converter converts the signal that it receives to an electrical signal, and a processor that, responsive to the converted electrical signal, changes the level of the control signal supplied to the electrically controlled variable attenuator as a function of the level of the converted electrical signal and level of a power signal selected as a function of the number of signals of different wavelengths received at the input of the input amplification stage.

6. The optical amplifier of claim 1 wherein the output amplification stage includes at least a wavelength division multiplexer (WDM) and an erbium doped fiber, in which the erbium doped fiber amplifies the signal supplied by the gain flattening filter in accordance with an optical power signal supplied via the WDM, and in which the WDM then supplies the latter amplified signal to an output for delivery to a transmission line.

7. An optical amplifier comprising an input stage for amplifying an optical signal received via an optical transmission line, in which the optical signal is composed of a plurality of optical signals of different wavelengths, an attenuator circuit for attenuating the signal amplified by the input stage in accordance with the number of signals forming the plurality of optical signals, and a gain flattening filter having a response that is an inverse of a gain spectrum of the input stage and an output stage for then processing the optical signal outputted by the attenuator circuit, in which the output stage amplifies the signal that has been processed by the gain flattening filter.

8. An attenuator circuit for an optical amplifier, said attenuator circuit comprising an electrically controlled variable attenuator for attenuating an optical signal amplified by an input amplification stage in accordance with a control signal, an optical coupler operative for supplying a portion of the attenuated signal to a converter circuit and supplying the remainder of that signal to an output of the attenuator circuit, in which the converter converts the signal that it receives to an electrical signal, and a processor that, responsive to the converted electrical signal, changes the level of the control signal supplied to the electrically controlled variable attenuator as a function of the level of the converted electrical signal and level of a power signal selected as a function of a number of signals of different wavelengths forming the optical signal received at the input to the attenuator circuit.

9. An optical amplifier comprising apparatus for receiving an optical signal at an input of the optical amplifier, in which the signal is formed from a plurality of optical signals of respective wavelengths, an input stage for amplifying the optical signal received at the input, apparatus for adjusting the level of the amplified input signal to a predetermined level as a function of the level of power contained in the received signal, apparatus for increasing substantially wavelength dependence of the optical amplifier, and an output stage for amplifying the adjusted optical signal.

* * * * *

UNITED STATES PATENT AND TRADEMARK OFFICE
CERTIFICATE OF CORRECTION

PATENT NO. : 5,900,969
DATED : May 4, 1999
INVENTOR(S) : Atul Kumar Srivastava, James W. Sulhoff, Yan Sun, Jianhui Zhou, John Lehrer Zyskind It is certified that error appears in the above-identified patent and that said Letters Patent is hereby corrected as shown below:

Column 1,
Line 2, after the Title insert
-- ACKNOWLEDGEMENT OF GOVERNMENTAL RIGHTS This invention was made with Government support under Agreement No. MDA 972-94-3-0036 awarded by ARPA. The Government has certain rights in the invention. --

Signed and Sealed this

Twenty-seventh Day of November, 2001

Attest:

*Nicholas P. Godici*

NICHOLAS P. GODICI
*Attesting Officer*     *Acting Director of the United States Patent and Trademark Office*

UNITED STATES PATENT AND TRADEMARK OFFICE
CERTIFICATE OF CORRECTION

PATENT NO.    : 5,900,969
DATED         : May 4, 1999
INVENTOR(S)   : Atul Kumar Srivastava et al.

It is certified that error appears in the above-identified patent and that said Letters Patent is hereby corrected as shown below:

<u>Column 6,</u>
Line 50, delete "increasing" and insert -- reducing -- after the word "substantially".

Signed and Sealed this

Fifteenth Day of April, 2003

JAMES E. ROGAN
*Director of the United States Patent and Trademark Office*